Aug. 16, 1966  T. R. HOWARTH  3,266,308

GAS METER CHANGE-OVER FITTING

Filed Nov. 12, 1963

INVENTOR:
THOMAS R. HOWARTH
BY
Norman Gerlach

United States Patent Office 3,266,308
Patented August 16, 1966

3,266,308
GAS METER CHANGE-OVER FITTING
Thomas R. Howarth, Highland, Ind., assignor to Eclipse Fuel Engineering Co., Rockford, Ill., a corporation of Illinois
Filed Nov. 12, 1963, Ser. No. 322,951
2 Claims. (Cl. 73—201)

The present invention relates generally to gas meter change-over fittings and has particular reference to a new and improved fitting which makes possible the periodic changing of the associated domestic or commercial gas meter without interruption of service.

There are at the present time upon the market various devices by means of which gas meters may be substituted or replaced without interrupting service. These devices, however, are in the form of gas meter by-passes and involve the use of rotatable valves which, when in their normal inoperative position, establish a flow of gas from the gas mains through the meters to the service lines, and when in their operative position, establish a flow of gas from the gas mains directly into the service lines, thus by-passing the meters and cutting off the flow of gas to the meters so that meter removal and replacement operations may be effected without escape of gas other than a small amount of residual gas in the meters. Such devices are predicated upon the fact that, from time to time, either as specified by law or as dictated by the gas service company's policy of recalibrating gas meters at intervals of from two to three years or more, gas meter substitution or exchange is resorted to both in household and commercial practice. The advantages of an efficient means for permitting meter-substitution or change-over without interruption of service as well-known and require little discussion herein other than to mention the fact that these advantages accrue to both the householder (gas user) and the gas service company's employee since they obviate the necessity of the householder being present on the premises to shut down such appliances as may be in operation and to point out to the employee such pilot lights as must be relighted after a meter substituion or change-over operation has been completed.

A by-pass type device which embodies one or more rotatable valves and switches the flow of gas directly from the gas main into the service line is not altogether satisfactory for several reasons, and principal among these is the fact that due to the infrequency with which meter substitution or change-over is resorted to, the rotary valves tend to become frozen due to long periods of inactivity and cannot be operated. Where plural valves are provided and are incorporated in the conventional horizontal meter bar by means of which the meter is supported from the various gas lines, the mechanical connection by means of which one valve is operated from another valve will frequently possess insufficient strength to operate the first valve if it has become frozen. Additionally, whether such bypass valve-type devices are incorporated in the meter bar or whether they are separate therefrom, they are an invitation to gas conversion by the consumer.

The present invention is designed to overcome the above-noted limitations that are attendant upon the construcion and use of gas meter by-pass devices, and toward this end, the invention contemplates the provision of a novel gas meter change-over fitting which is capable of being operatively and permanently installed at any point in the service line leading from the outlet side of the gas meter, and when so installed, is capable of being manipulated so that it may assume an inoperative condition wherein normal flow of gas from the meter and through the service line will obtain, or so that the connection leading from the outlet side of the meter is closed off, while at the same time, the service line is opened to a separate and portable source of gas under pressure, the latter serving as a temporary source of gas supply through the service line while meter substitution or change-over operations are in progress. By closing off the connection leading from the outlet side of the meter, escape of pressurized gas to the atmosphere when the meter is removed from its fittings is prevented and the available pressurized gas is directed solely to the service line which at no time is either shut off or bled to atmosphere. After the meter substitution or change-over has been effected, according to the present invention, the shut-off cock at the inlet side of the gas meter is first opened, after which the gas meter change-over fitting is restored to its inoperative condition, at which time the outlet side of the gas meter is again connected to the service line while the supply of pressurized gas from the separate and portable source is automatically discontinued. Such source of pressurized gas may then be disconnected from the change-over fitting and taken away by the employee of the gas service company.

The provision of a gas meter change-over fitting of the aforementioned character being the principal object of the invention, a further object is to provide such a fitting which is substantially tamper-proof, its tamper-proof characteristics being enhanced by reason of the fact that it embodies no rotary valves which may be manipulated by the consumer and also by reason of the fact that it may if necessary be located at a point remote from the meter. Its tamper-proof characteristics are further enhanced inasmuch as it is not a meter bypass device and has no connection to the gas main ahead of the gas meter. Thus, with no connection to the inlet side of the gas meter, when manipulated so that it assumes its operative condition, no gas whatsoever other than an outside source of pressurized gas is available to the consumer.

It is another object of the invention to provide a gas meter change-over fitting which is of compact design and construction so that it consumes very little space in any given installation. Specifically, the fitting assumes the shape of an ordinary gas line T and is of the approximate size of such a T. Only two right-angle legs of the T are used for connection in the service line to which it is applied and, thus, the fitting may be installed in the service line at any convenient point where two pipe sections or other fittings come together at a right angle. Usually, the installation will be made by substituting the change-over fitting for an elbow fitting. In most meter installations, an elbow fitting is disposed immediately above the meter bar or slightly to one side thereof so that the present change-over fitting may conveniently be installed at this point in close proximity to the meter bar although it is contemplated that remote installations may be made if desired.

A further object of the invention is the provision of a gas meter change-over fitting in the form of a two-way valve having dual inputs and a common output, together with a single noncorrosive movable valve element capable of selectively closing off either valve input. The valve element, being of a noncorrosive nature, is not subject to binding or freezing due to long periods of inactivity and, therefore, the fitting may be readily manipulated with comparative ease whenever such manipulation is required.

Numerous other objects and advantages of the invention not at this time enumerated will become readily apparent as the following description ensues.

In the accompanying single sheet of drawings forming a part of this specification, one illustrative embodiment of the invention has been shown.

Figure 1:
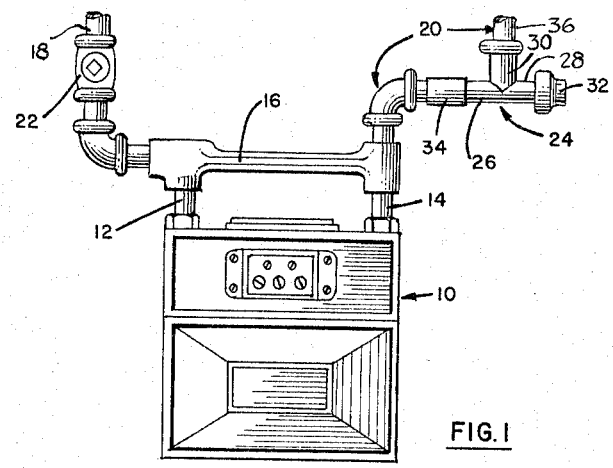
FIG. 1 is a front elevational view of a meter installation embodying the change-over fitting of the present invention.

Referring now to the drawings in detail and in particular to FIG. 1 wherein a gas meter installation embodying the change-over fitting of the present invention has been illustrated, a conventional gas meter 10 having an inlet connection 12 and an outlet connection 14 is suspended from a standard or conventional solid meter bar 16. The meter inlet connection 12 is connected by a pipe connection 18 to a gas main (not shown). The meter outlet connection 14 is connected to a composite gas service line 20. The pipe connection 18 has interposed therein a shut-off cock 22, and this cock, when closed, shuts off the supply of gas from the gas main to the meter and, consequently, to the service line 20. The change-over fitting of the present invention has been designated in its entirely by the reference numeral 24, and it is operatively interposed in the service line 20.

The change-over fitting 24 is generally in the form of a T and comprises two aligned inlet legs 26 and 28 and a single upstanding medial outlet leg 30 at right angles to the inlet legs. In the illustrated form of the fitting 24, the inlet legs 26 and 28 are provided with external screw threads, while the outlet leg is provided with internal screw thread, thus accommodating the illustrated complementary pipe sections which form parts of the service line 20 and to which the legs 26 and 30 of the fitting 24 are operatively connected. It is contemplated that the legs 26 and 30 may be provided with either external or internal screw threads as required to accommodate complementary pipe sections which may be encountered in different forms of composite service lines. The leg 28, however, will preferably be formed with an external screw thread as shown in order to accommodate reception thereover of a closure cap 32, the function of which will be made clear presently. The change-over fitting 24 is adapted to be connected in the service line 20 in such a manner that the leg 26 communicates directly with the meter outlet connection 14, while the leg 30 communicates with that portion of the service line that leads to the various gas outlets of the building installation to which gas appliances are connected. In the illustrated environment of the change-over fitting 24, the inlet leg 26 is connected to a sleeve 34 (see FIGS. 2 and 3), while the outlet leg 30 is connected to a pipe section 36.

Figure 4:
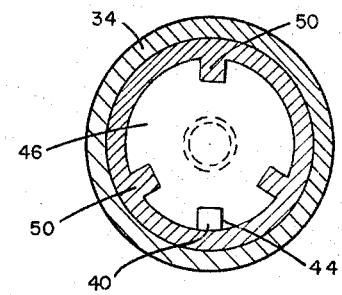
FIG. 4 is a sectional view taken on the line 4—4 of FIG. 3.
Figure 3:
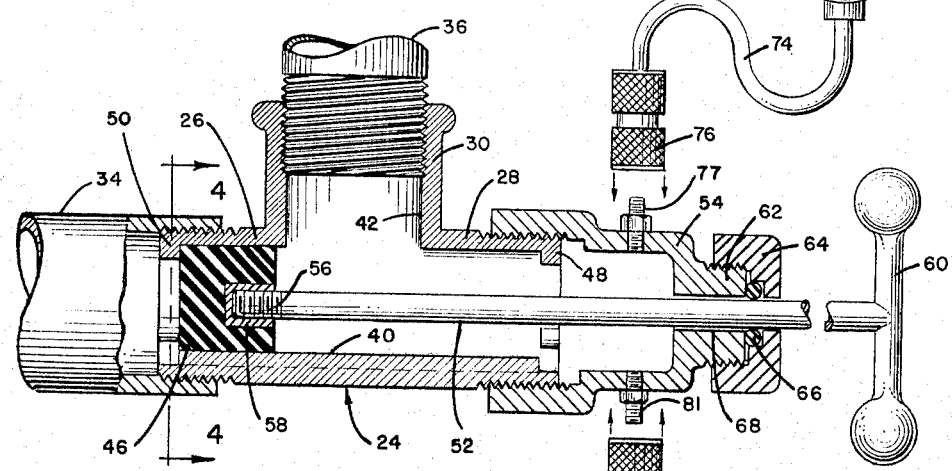
FIG. 3 is a sectional view similar to FIG. 2, but showing the change-over fitting in its operative condition.
Figure 2:
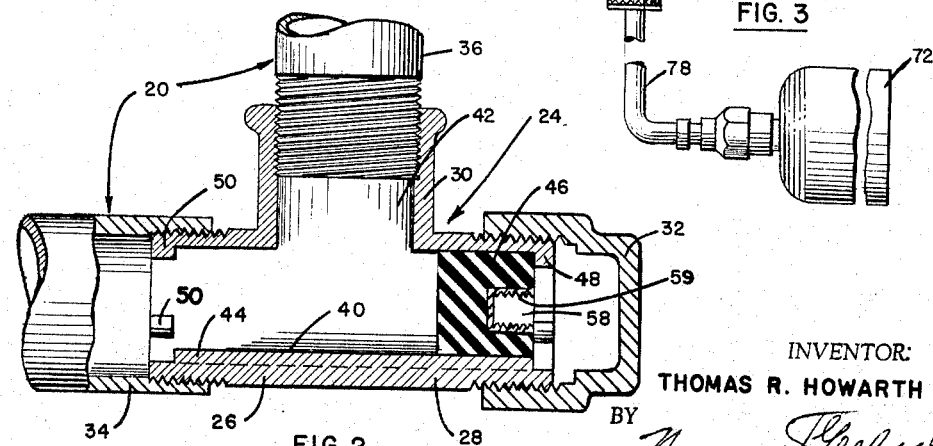
FIG. 2 is a sectional view taken substantially centrally and longitudinally through the change-over fitting of the present invention and showing the same in its inoperative condition.

The two aligned legs 26 and 28 establish an elongated horizontal bore 40 through the fitting and the vertical leg 30 establishes a vertical bore 42 in communication with the central portion of the bore 40. The bore 40 is formed with an internal spline 44 (see FIG. 4) which extends longitudinally along the bottom region of the bore and on which there is slidable a non-rotatable cylindrical valve plug 46. The valve 46 is movable between an inoperative position wherein it closes off the leg 28 as shown in FIG. 2 and an operative position wherein it closes off the leg 26 as shown in FIG. 3. In its inoperative position, the valve plug 46 bears against a plurality of spaced apart inwardly extending stop lugs 48 on the extreme outer end region of the leg 28. In its operative position, the valve plug 46 bears against a plurality of similar spaced apart inwardly extending stop lugs 50 on the outer end region of the leg 26.

The valve plug 46 is preferably formed of a suitable resilient elastomeric material, such as rubber, either natural or synthetic, or a rubber substitute. Various plastic materials are also suitable for forming the plug, but in any event, the material employed should be of such a character that it possesses a limited degree of resistance to compressional forces and fit snugly within the bore 40, yet be capable of sliding movement therein under the influence of manual pressure, as will be described subsequently.

The valve plug 46 is capable of being manipulated between its operative and inoperative positions by means of a tool assembly including an operating rod 52 and a cup-shaped guide cap 54, the rod 52 extending through and being longitudinally slidable in the guide cap 54, and the latter being capable of threaded reception on the leg 28 when the previously mentioned closure cap 32 is removed. The inner end of the operating rod 52 is provided with an external screw thread 56 for threaded reception in an insert cup 58. The latter is embedded in the adjacent end of the valve plug 46 and has on the inner surface of its side wall an internal screw thread 59 for receiving the external screw thread 56 on the inner end of the operating rod 52. The outer end of the operating rod 52 is provided with a transverse handle bar 60 in order that the rod may be stripped in connection with turning and longitudinal shifting thereof. The guide cap 54 is provided on its cross wall with an axially extending externally threaded boss 62 over which there is threadedly received an internally threaded sealing cap 64 carrying an O-ring 66. The latter, when the sealing cap is in place on the boss 62 (see FIG. 3), seals the opening 68 in the cross wall of the guide cap 54, i.e., the opening, through which the operating rod 52 extends. The opening 68 affords a slight clearance for the operating rod 52 in order to prevent binding when the rod is manipulated, as hereinafter described.

The guide cap 54, in addition to its function of affording a guide for the operating rod 52, also functions as a fitting for connecting the cap to a pressure gauge 70 and to a portable source of gas under pressure, such, for example, as the pressure cylinder 72. Connection may be made to the pressure gauge 70 through a flexible line 74 having a quick release connection 76 for attachment to a tubular connection 77 which is connected to and extends through the cylindrical wall of the guide cap 54, while connection may be made to the pressure cylinder 72 through a flexible line 78 having a similar quick release connection 80 for attachment to a tubular connection 81 which is connected to and extends through the cylindrical wall of the guide cap 54.

The operation of the above-described gas meter change-over fitting 24 is such that when initially installed in a service line such as the service line 20 with the valve plug 46 disposed in the leg 28 and against the stop lugs 48, gas may flow from the pipe connection 18 through the shut-off cock 22, the meter inlet connection 12, the meter 10, the meter outlet connection 14 and from thence through the change-over fitting 24 by way of the legs 26 and 30 to the portion of the service line 20 that leads to the various gas outlets. The closure cap 32 is normally maintained in position over the leg 28 to prevent unauthorized access to the valve plug 46. The internal gas pressure within the bore 40 will tend to maintain the valve plug 46 in its extreme position against the stop legs 48 and it will also tend to cause the plug to be expanded into sealing engagement with the cylindrical inner surface of the leg 28.

When it is necessary to remove the meter 10 for purposes of replacement, repair or for any other reason whatsoever, the employee of the gas service company will first remove the closure cap 32 and thus expose the insert cup 58. Then, with the insert cup 58 in full view of the service employee, the threaded inner end of the operating rod 52 is caused to be threadedly received within the cup 58 utilizing the handle bar 60 for torque application, and thereafter, the guide cap 54 with its attached sealing cap 64 will be slid along the guide rod and threadedly received on the external screw thread on the outer end region of the leg 28. During threading of the inner end of the operating rod 52 into the embedded cup 58, reaction against the torque which is applied to the plug 46 by the operating rod 52 is assimilated by the spline 44 so that the plug is held against turning movement within the leg 28. The quick release connection 76 for the pressure gauge 70 and the quick release connection 80 for the pressure cylinder 72 are then applied to their respective connectors on the cylindrical side wall of the guide cap 54, in the order named, after which the service employee will push the operating rod to the left as viewed in FIGS. 2 and 3 so that the valve plug 46 will become dislodged from its sealing position within the leg 28 and slid along the bore 40 so that it enters the leg 26 and bears against the stop lugs 50. Dislodgment of the valve plug 46 from the leg 28 will open the leg 30 to communication with the leg 28 so that pressurized gas emanating from the pressure cylinder 72 will flow through the line 78, the quick release connection 80, the connector 81, the guide cap 54, the leg 28 and the leg 30 to the portion of the service line 20 that leads to the gas outlets. The supply of pressurized gas to and through the service line 20 is instantaneous and, in fact, it precedes by a slight fraction of a second the blocking-off of gas issuing from the outlet fitting 14 of the meter at the time that the valve plug enters the leg 26 so that gas pressure in the service line is maintained, thus insuring that no automatic appliance or other utility then in use is deprived of gas. Pilot lights of automatic appliances not in use will thus remain ignited.

Preferably, the pressure of gas within the pressure cylinder 72 is greater than line pressure in the gas main so that as soon as the valve plug 46 enters the leg 26, the unbalanced pressure on opposite sides of the valve plug will maintain the plug seated against the stop lugs 50.

After the operating rod 52 has been pushed to the left as previously described and the valve plug 46 has entered the leg 26, the gas shut-off cock 22 may then be closed to shut off the supply of gas to the meter 10 and the latter may then be detached from the meter bar 16 and a replacement meter installed in its place. During such time as the meter bar 16 is devoid of a meter, the plug 56 closes off the leg 26 and prevents escape of pressurized gas emanating from the pressure cylinder 72 from escaping to atmosphere through said leg 26.

After the replacement meter has been operatively installed on the meter bar 16, a reversal of the above outlined procedure is resorted to to restore the service line to its normal operating condition. This reversal of procedure includes pulling of the operating bar 52 to the right, as viewed in FIGS. 2 and 3, to restore the valve plug 46 to the leg 28, removal of the quick release fittings 80 and 76 in the order named, removal of the guide cap 54 and its remaining adjuncts including the operating rod 52, unthreading of the inner end of the rod from the insert cup 58, and finally, re-application of the closure cap 32 to the leg 28 of the change-over fitting 24. With the valve plug 46 in the leg 28, communication between the legs 30 and 26 is again established so that upon opening of the shut-off cock 22, normal gas service is restored and measured by the meter 10.

The invention is not to be limited to the exact arrangement of parts shown in the accompanying drawing or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by letters patent is:

1. A gas meter change-over fitting of the character described and designed for connection in a service line leading from the outlet of a gas meter, said fitting comprising a T having first and second aligned inlet legs presenting a common cylindrical bore therethrough, and a medial outlet leg presenting a lateral cylindrical bore intersecting the common bore, said first inlet leg being adapted for connection to the meter outlet, said outlet leg being adapted for connection to a portion of the service line leading to a service outlet, a valve plug formed of resilient material and slidably disposed within said common bore and movable between an inoperative position wherein it is disposed in and seals off the second inlet leg thus establishing communication between the first inlet leg and the outlet leg, and an operative position wherein it is disposed in and seals off the first inlet leg thus establishing communication between the second inlet leg and the outlet leg, a guide cap removably received over the outer end of the second inlet leg, an operating rod projecting through and slidable in said guide cap, said valve plug being formed with a threaded socket therein, the inner end of said operating rod being threaded for removable reception in said threaded socket to the end that the operating rod may be removably connected to the valve plug in push-pull relationship, said T being formed with an elongated spline thereon internally of said common bore, the outer face of said valve plug being provided with a spline-receiving recess which slidably receives said spline and coacts therewith to prevent rotative movement of the valve plug within said common bore and thus facilitate threaded engagement between the operating rod and valve plug, and means for introducing gas under pressure to the interior of said guide cap.

2. A gas meter change-over fitting as set forth in claim 1 and including, additionally, a closure cap designed for removable reception over said second inlet leg when the guide cap is removed therefrom.

References Cited by the Examiner

UNITED STATES PATENTS

| | | | |
|---|---|---|---|
| 3,062,496 | 11/1962 | Stehlin | 251—324 X |
| 3,148,690 | 9/1964 | Petersen | 73—201 X |
| 3,173,295 | 3/1965 | Magleby | 73—201 |
| 3,187,570 | 6/1965 | Mueller | 73—201 |

RICHARD C. QUEISSER, *Primary Examiner.*

E. D. GILHOOLY, *Assistant Examiner.*